United States Patent Office 3,474,161
Patented Oct. 21, 1969

3,474,161
METHOD OF MOLDING THERMOSETTING
PLASTIC ARTICLES
David H. Reighter, Roslyn, Pa., assignor to I-T-E Imperial Corporation, Philadelphia, Pa., a corporation of Delaware
No Drawing. Filed Dec. 15, 1967, Ser. No. 690,736
Int. Cl. B29c 5/06
U.C. Cl. 264—87       9 Claims

ABSTRACT OF THE DISCLOSURE

Plastic molded articles are produced by preparing an aqueous suspension of finely divided thermosetting plastic material, pouring said suspension into a mold of porous material and extracting the water from the suspension leaving an uncured molded article. This article is then sprayed with a fast-curing material to set the form of the molding and the article is then heated to fuse and cure the inner segment of the molded article.

FIELD OF THE INVENTION

This invention relates to a novel method of producing accurate moldings of thermosetting plastic materials, in particular, articles having a substantial cross-section.

DESCRIPTION OF THE PRIOR ART

The molding of thermosetting plastic articles, in particular articles of substantial cross-section using thermosetting plastic materials, is well known in the art. The method utilized heretofore involves pouring the molten thermosetting plastic into a mold and curing the plastic under pressure in said mold. This process has a number of associated inconveniences. The dies utilized must be of steel, which involves considerable expense, and where epoxy resins are used in the die a sticking problem arises which gives rise to inaccurate moldings or moldings with faulty surfaces. Furthermore, a particular defect known as "bubbling" or the formation of voids within the mold is quite common in this molding procedure. Where the molded article has no internal function such bubbling merely mars the appearance of the article and is not serious, however, where the article has an internal function, for example where the article contains one or more transformer coils within the mold, such defects may give rise to a breakdown of the electrical insulating properties of the mold which in turn may cause the complete breakdown of the function of the finished article. Finally, the press molding process is rather slow, and the number of articles that may be produced within a given time period by a relatively expensive piece of machinery such as a molding press is somewhat limited.

The process of the present invention allows articles of thermosetting plastic material to be prepared very rapidly using inexpensive equipment, and inexpensive plaster dyes.

The use of a suspension of finely divided ceramic material is an aqueous medium for the purpose of vacuum molding is known. An apparatus for manufacture of ceramic moldings using a molding press is disclosed in U.S. Patent No. 2,770,025 to J. Mollers. In U.S. Patent No. 2,765,512 to Nesbit there is disclosed a process whereby a suspension of finely divided clay is cast into a flexible mold, the moisture substantially removed from the ceramic, the molded article frozen, the flexible mold stripped therefrom and the molded ceramic article fired. A process for producing high dielectric high insulation ceramic plate by a similar process is disclosed in U.S. Patent No. 2,582,993. It should be noted that none of those patents in any way suggests that finely divided thermosetting material could be used in place of a ceramic procursor such as clay. An advantage accruing from the use of a thermosetting material in such a process rather than a ceramic material, is that a far, far, lower cure temperature can be employed to produce the finished article. This is a particularly significant advantage where the final article is to enclose components which are sensitive to temperature. For example, it will be readily seen that the electrical characteristics of a transformer winding might well be seriously affected by heating to temperatures necessary for the firing of a ceramic article. Furthermore, nothing in the prior art suggests that the pre-cured molded article could be maintained in its form during the process of cure by the application thereto of a compatible but rigid shell. This protection problem in the intermediate stage of the process is solved by the applicant in his discovery that a rapid curing plastic coating, for example an epoxy resin coating, could be readily sprayed upon the uncured molding in such a manner as to preserve its shape.

SUMMARY OF THE INVENTION

In the process of the present invention, a mold of porous material, is prepared and where it is desired to encapsulate an article in the final molded product, this article is inserted into the mold. A slurry of an "A" stags or "B" stage molding powder suitably an epoxy powder is prepared in a suitable suspendent which does not dissolve either the components in the resin or the mold. The suspension of resin powder is poured into the porous mold and suction is then applied to the exterior of the porous mold to remove the suspendent from the slurry. More slurry is added to fill the mold if this should be required by the nature of the final molded article. Upon removal of the suspendent by suction, the article is removed from the mold, suitably by reverse air pressure, and the uncured molded article permitted to dry slowly. This may be done under reduced pressure, and under gentle heat. The dry uncured molded article is then sprayed, painted or dipped into a room-temperature curing epoxy resin, or other rapid curing resin to provide a tough temperature resistance coating for the article. The only necessary criterion for this coating resin is that it will maintain its shape at a temperature suitable for curing the bulk of the resin used for molding the total article.

The coated article is then heated to a temperature necessary to cure the bulk resin.

PREFERRED EMBODIMENTS

In the preferred embodiment of the present invention, a "B" stage epoxy resin powder is worked into a stiff putty with water. An "A" stage epoxy resin powder may also be blended with water to a putty and used for this purpose, although for reasons which will become apparent immediately hereinbelow, the "B" stage powder is to be preferred.

An "A" stage epoxy resin is that mixture of epoxy resin, hardeners and catalysts that has not advanced in its cross linking beyond the point where it is liquid or can be made liquid by the application of heat. Hence, it will be clear from the nature of the process involved herein that the only "A" stage resins which are suitable for this process are those which are solids at ambient temperatures and can thus be worked into a solid/liquid emulsion with a suspendent rather than into a liquid/liquid emulsion with a suspendent. Apart from this requirement, any "A" stage epoxy resin may be utilized in this process.

A "B" stage epoxy powder is an epoxy resin, hardener and catalyst that has advanced in its cross-linking to a solid state, but is not completely cross-linked. At this stage, it is still soluble in common solvents. It will, therefore, be readily seen that a "B" stage epoxy powder is the most suitable form of powder for carrying out the process of the present invention, since it may readily be slurried with water to form a putty.

The suspending agent is not limited to water, although this suspending agent is preferred. Lower alkanols, such as methanol or ethanol or aliphatic hydrocarbons such as petroleum ethers and the like, may also be employed. These latter classes of solvents possess the advantage of evaporating more rapidly out of the cast mold than water. However, it must also be borne in mind that these substances are not suitable in this process where they act in whole or in part as solvents for the epoxy resin powder employed. A further possible disadvantage lies in their varying degrees of inflammability. Thus, the choice of suspendent is a matter of discretion and will be controlled by the speed of process required, and the anti-inflammation precautions which are available at the locale where the molding being carried out.

While epoxy resins are preferred in this process, any thermosetting plastic which can be made into a powder in its uncross-linked state may be employed. Examples of such resins which are suitable for employment in the process of the present invention include polyester resins, alkyds, phenolic, melamine and urea resins as well as cross-linked polyethylene.

Where a higher degree of mechanical strength is required, or where it is not deemed necessary to constitute the molded article entirely out of thermosetting plastic, filler and reinforcing agents may be mixed in with the molding putty. Such fillers and reinforcing agents are those commonly used in the field, and include silicas, clays, chopped glass fibers, asbestos, glass flakes, glass microballoons, cotton flock and carbon. This recital of suitable fillers is merely indicative of those substances which may be used in this process and is not intended to be limiting. Any filler used in this plastic molding art could be employed in the present process.

In removing the suspendent from the mold through the porous walls of the mold, the suction used should be the best vacuum readily available, however, pressures above 10 millimeters of mercury will not adequately remove the suspendent, particularly if the suspendent is water, and pressures lower than 2 millimeters of mercury are not required for the efficient operation of the suspendent removal step. Indeed if the pressure is too low, the rapid evaporation of the suspendent may cause voids and faults due to localized freezing.

After evaporation of the suspendent from the molded article, the back pressure upon the mold in order to expel the article should be of the order of 3 to 15 pounds per square inch, as measured on the exterior of the mold.

It is preferred to remove the last traces of suspendents from the molded article after expulsion from the mold by drying in a vacuum oven. The pressure in this oven may lie commonly between 1 and 10 millimeters of mercury. These limits, however, being merely preferred and not by any means to be considered limiting or critical. With respect to drying temperature, the permissible upper limit should be not less than 50° C. below the temperature at which the resin employed starts to cure and must in all cases be below the heat distortion point of the plastic. Thus, the preferred drying temperature is strictly a function of the molding resin employed. The time for drying the article is, of course, dependent upon the parameters of temperature and pressure in the drying oven. However, under most circumstances, a period between thirty minutes and one hour has been found sufficient.

Prior to curing, the dried molded article is coated with a rapid drying room cure resin. The coating may be applied by spraying, painting or dipping and the formulation will depend upon the ultimate purpose of the article. The sole criterion apart from the ultimate exterior resistance to wear sought from the molded article which will determine the nature of the room curing resin employed is its temperature stability. There is an absolute requirement that the coating employed be unaffected either physically or chemically by temperature at, or slightly in excess of, the optimum molding temperature of the resin which constitutes the main bulk of the molded article. Thus, for example, if the resin utilized for the bulk of the article has an optimum cure temperature of 177° C., it would be desirable to utilize a coating resin which is stable at least at 177° C.

After the coating resin has set, the molded coated article is placed in a curing oven and there cured at a temperature and for a time determined by the nature of the resin employed. Generally speaking almost all of the resins suitable for the purposes disclosed herein will cure in from about 10 to about 30 minutes at a temperature of from about 200° C. to about 350° C. After curing and upon cooling the molded article is ready for use.

Although the invention has been described above with respect to its preferred embodiments, it will be understood that many variations and modifications will be obvious to those skilled in the art. It is preferred therefore that the scope of the invention be limited not by the specific disclosure herein but only by the appended claims.

Example 1

A general purpose coating resin which will dry in three hours at room temperature may be compounded from CIBA resin 502, 90 parts, by weight and CIBA hardener 951, 10 parts by weight.

Example 2

A track resistant coating which will dry in three hours at room temperature may be prepared from CIBA resin 502, 90 parts by weight and CIBA hardener 951, 10 parts by weight, together with anhydrous aluminum hydroxide, 10 parts by weight.

Example 3

A resin coating which is suitable for outdoor weathering may be prepared from a mixture of CIBA resin 488 E-32, 201 parts by weight, Cellosolve, 66 parts by weight rutile (titanium dioxide), 100 parts by weight, which mixture is run through one pass on a three roll print mill. To the milled mixture is added a mixture of CIBA resin 488 E-32, 254 parts by weight, methyl isobutyl ketone, 96 parts by weight, Cellosolve, 30 parts by weight, xylene, 98 parts by weight. This coating will dry at 35 minutes at room temperature or in ten minutes at 200° C. Drying at the higher temperature is not recommended since it is very close to the cure temperature of many of the resins used to form the bulk of the molded article.

Example 4

The "B" stage epoxy powder is formulated as follows:

| Material | Parts by weight | Source |
| --- | --- | --- |
| Epi-rez 540-C | 100 | Celanese Resins. |
| Phos-chek P-30 | 7 | Monsanto Co. |
| Dechlorane (5 to 10 micron) | 20 | Hooker Chem. Co. |
| Polyazelaic Polyanhydride | 7 | Emery Industries Inc. |
| Cabosil M-5 | 3 | Cabot Corp. |
| Ferro V-8835 Red | 3 | Ferro Corp. |
| Hexamethylene Tetramine | 2 | E. I. Du Pont de Nemours. |

The compounding procedure used in preparing this formulation consists of heating the Epi-Rez 540-C to 350-400° F. and dispersing the Phos-Chek P-30 and Dechlorane into the hot resin with the use of a drill press and impeller. After the intumescent fillers were completely dispersed into the hot resin, the Polyazelaic Polyanhydride was added and mixed until a homogeneous blend was obtained. The above hot melt processing could be accomplished more conveniently in a Baker-Perkins blender or an extruder. The cooled compound was subsequently pulverized in a hammer mill, dry blended with Cab-O-Sil M-5, red pigment, and the accelerator (Hexamethylene Tetramine) in a Twin Shell blender, then ground for 6-8 hours in a pebble mill.

The molding and coating process is carried out as follows:

This dry, prepared powder is now mixed with water to form a stiff putty. A mass of this is placed in a dry porous mold made of plaster of paris and pressed with the required pressure necessary to form the part. A vacuum is now drawn on both top and bottom of the mold while holding pressure. Air at 3-30 p.s.i. is now introduced into the bottom mold and the press opened. The part formed will now be holding on the top die platen and can be easily released by the removal of the vacuum and the application of air, again 3-30 p.s.i. as required by the shape of the part. The part is now dried, to a constant weight which indicates that all the moisture is removed. This can be accomplished either by holding approximately 30 minutes in a vacuum chamber or by air drying at room conditions for approximately 16 hours. This is now coated with a brush or spray using a solution of 100 parts of CIBA 502 resin with 10 parts of catalyst CIBA 951. This is allowed to harden which will require at least three hours at room temperature. Now the part can be cured at 200° C. for 10 to 30 minutes depending on the size. The part is finished.

Although the invention has been described above with respect to its preferred embodiments, it will be understood that many variations and modifications will be obvious to those skilled in the art.

I claim:
1. A process for producing molded articles of thermosetting plastic material which comprises the steps of:
   (1) preparing a suspension of partially cross-linked thermosetting resin powder in a suspendent,
   (2) pouring the suspension of resin powder into a porous mold,
   (3) applying a partial vacuum to the exterior of the mold to remove the suspendent therethrough,
   (4) applying back pressure to the exterior of the mold to separate the molded article from the mold,
   (5) drying the molded article,
   (6) coating the molded article with a room-temperature curing resin,
   (7) curing the coating,
   (8) heating the article to cure the thermosetting resin.

2. A process according to claim 1 wherein the resin is an A-stage epoxy resin.

3. A process according to claim 1 wherein the resin is a B-stage epoxy resin.

4. A process according to claim 1 wherein the resin is selected from the group consisting of polyester, alkyd, phenolic, melamine, and urea resins, and cross-linked polyethylene.

5. A process according to claim 1 wherein the suspendent is water.

6. A process according to claim 1 wherein the suspendent is a lower alkanol or an aliphatic hydrocarbon.

7. A process according to claim 1 wherein the suspension of molding powder additionally comprises a filler.

8. A process according to claim 1 wherein the coating resin comprises a rapid setting epoxy resin and a hardener.

9. A process according to claim 1 wherein the coated article is cured by heating to a temperature of between 80 and 100° C.

References Cited
UNITED STATES PATENTS

| | | | |
|---|---|---|---|
| 2,161,281 | 6/1939 | Carter | 264—86 |
| 3,235,636 | 2/1966 | Trimble | 264—87 |
| 3,419,455 | 12/1968 | Roberts | 264—255 X |

ROBERT F. WHITE, Primary Examiner

J. H. SILBAUGH, Assistant Examiner

U.S. Cl. X.R.

264—129, 236, 255, 335